United States Patent [19]

Coué

[11] 4,452,593
[45] Jun. 5, 1984

[54] GUIDING AND ACTUATING MECHANISM IN PARTICULAR FOR A BICYCLE DERAILLEUR

[75] Inventor: Maurice E. L. Coué, Feucherolles, France

[73] Assignee: Huret et ses Fils, Nanterre, France

[21] Appl. No.: 388,207

[22] Filed: Jun. 14, 1982

[30] Foreign Application Priority Data

Jun. 17, 1981 [FR] France .............................. 81 11974

[51] Int. Cl.³ ............................................ F16H 11/08
[52] U.S. Cl. ....................................... 474/80; 414/917
[58] Field of Search ....................... 474/78, 80, 81, 82; 248/281.1, 282, 284; 414/917

[56] References Cited

U.S. PATENT DOCUMENTS

| | | | |
|---|---|---|---|
| 3,910,136 | 10/1975 | Juy | 474/82 X |
| 4,194,409 | 3/1980 | Nagano | 474/80 |
| 4,362,522 | 12/1982 | Huret | 474/82 |

FOREIGN PATENT DOCUMENTS 2844122 4/1979 Fed. Rep. of Germany ........ 474/80
2380938 10/1978 France ................................ 474/82

Primary Examiner—Lawrence J. Staab
Assistant Examiner—Dwight G. Diehl
Attorney, Agent, or Firm—Trexler, Bushnell & Wolters, Ltd.

[57] ABSTRACT

The object of the invention is to provide a mechanism whose construction and assembly are simplified and whose cost is consequently reduced. The mechanism comprises a support device, a movable device connected to the support device in such manner as to be movable in translation relative to the support device by an actuating device. The support device and movable device are mounted on an intermediate member to pivot about respective pivot pins. The two pivot pins are parallel to each other and the intermediate member defines two cavities which are parallel and extend in a direction orthogonal to the two pivot pins. Two push-members are slidably mounted in the two cavities and the ends of the push-members are respectively in contact with two parallel surfaces. One of the surfaces is defined on the movable device and the other is defined on the fixed device.

7 Claims, 5 Drawing Figures

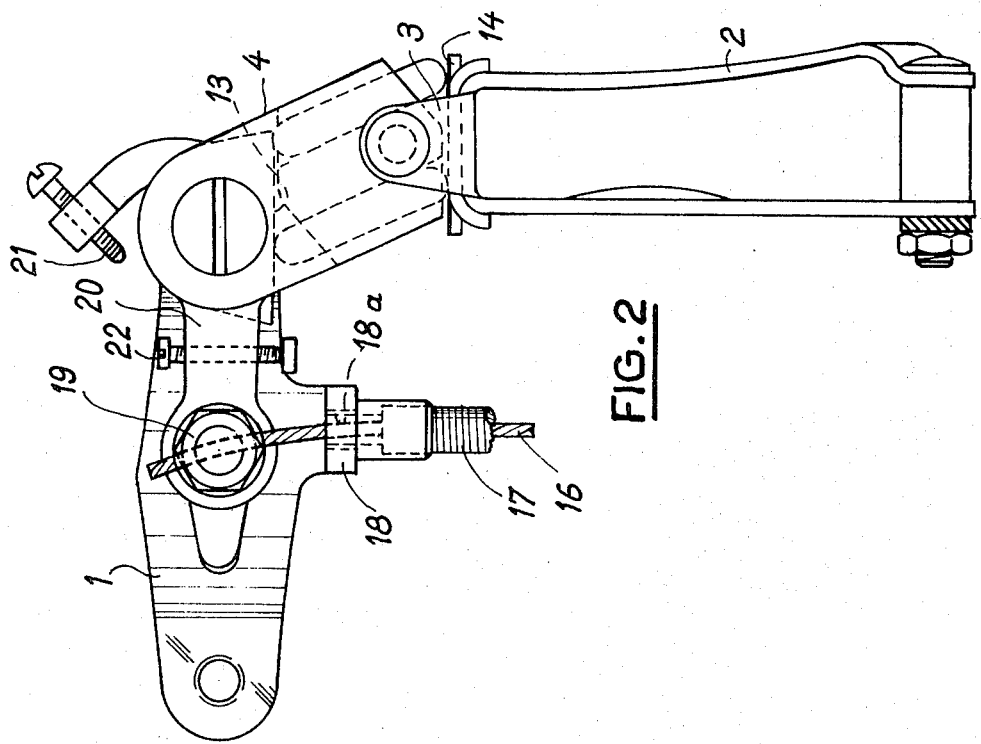
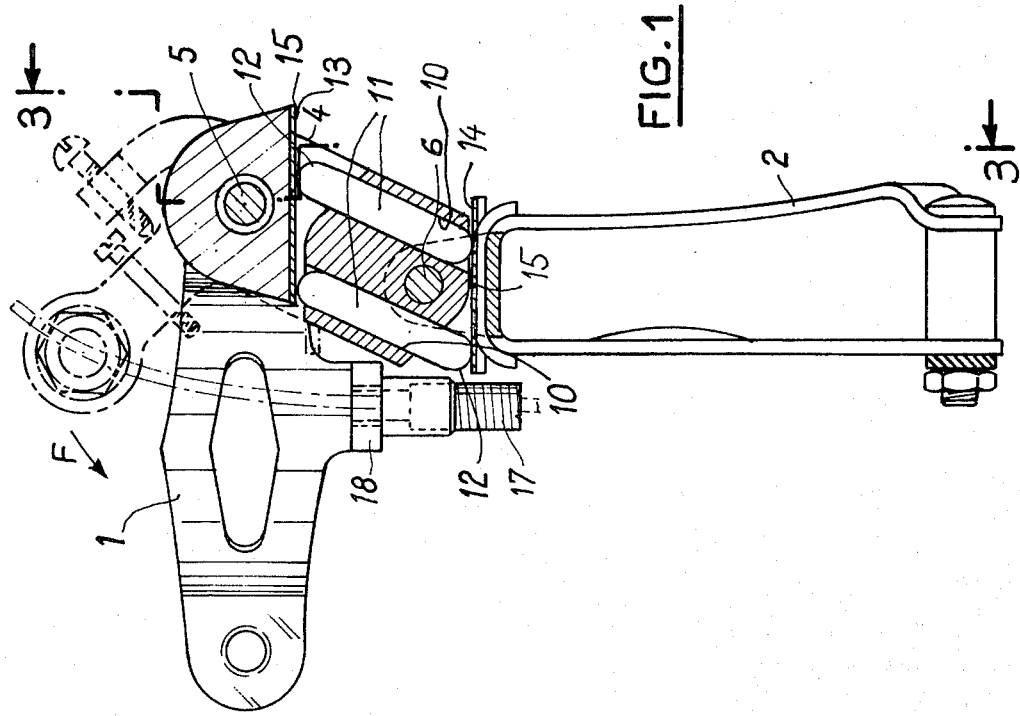
FIG.1
FIG.2

GUIDING AND ACTUATING MECHANISM IN PARTICULAR FOR A BICYCLE DERAILLEUR

DESCRIPTION

The present invention relates to guiding and actuating mechanisms which may be used, in particular but not exclusively, in bicycle derailleurs, whether it concerns crank-gear derailleurs or rear derailleurs.

It is known that such a derailleur comprises movable guiding or shifting means for the chain connected to a support means through two parallel links, this assembly constituting an artiuclated parallelogram structure. Under the effect of a traction on a cable or other actuating means, the movable means is shifted in translation with respect to the fixed support so as to guide the chain from one chain wheel to the other of the crank-gear or from one sprocket to the other of the free wheel.

Owing to the presence of two links and four pivot pins, such a mechanism is relatively complicated in construction and the object of the present invention is to provide a mechanism whose construction and assembly are simplified so that the cost price is lowered.

The invention provides therefore a guiding and actuating mechanism, in particular for a bicycle derailleur, said mechanism comprising a support means, movable means connected to the support means in such manner as to be movable in translation relative to the support means by actuating means, wherein the support means and the movable means are mounted to pivot about a pin on an intermediate member, the two pivot pins being parallel to each other, said intermediate member defining two parallel cavities which extend in a direction which is orthogonal to the orientation of said two pins and in which cavities are slidably mounted two push-members whose ends are respectively in contact with two parallel surfaces, one of which surfaces is defined by the movable means and the other of which surface is defined by the fixed means.

According to other features of the invention:

the two cavities defined in the intermediate member are symmetrically disposed on each side of a plane containing the two pivot pins connecting the intermediate member to the support means and to the movable means;

the surfaces with which the push-members are in contact are formed by, or lined with, an anti-friction material;

the cavities are preferably cylindrical and the push-members are preferably cylindrical and have rounded ends.

The invention will be described in more detail hereinafter with reference to the accompanying drawings, which are given solely by way of example and in which:

FIG. 1 is a view partly in elevation and partly in section of the mechanism according to the invention applied to a crank-gear derailleur;

FIG. 2 is an elevational view of this mechanism in another position of use;

Figure 3:
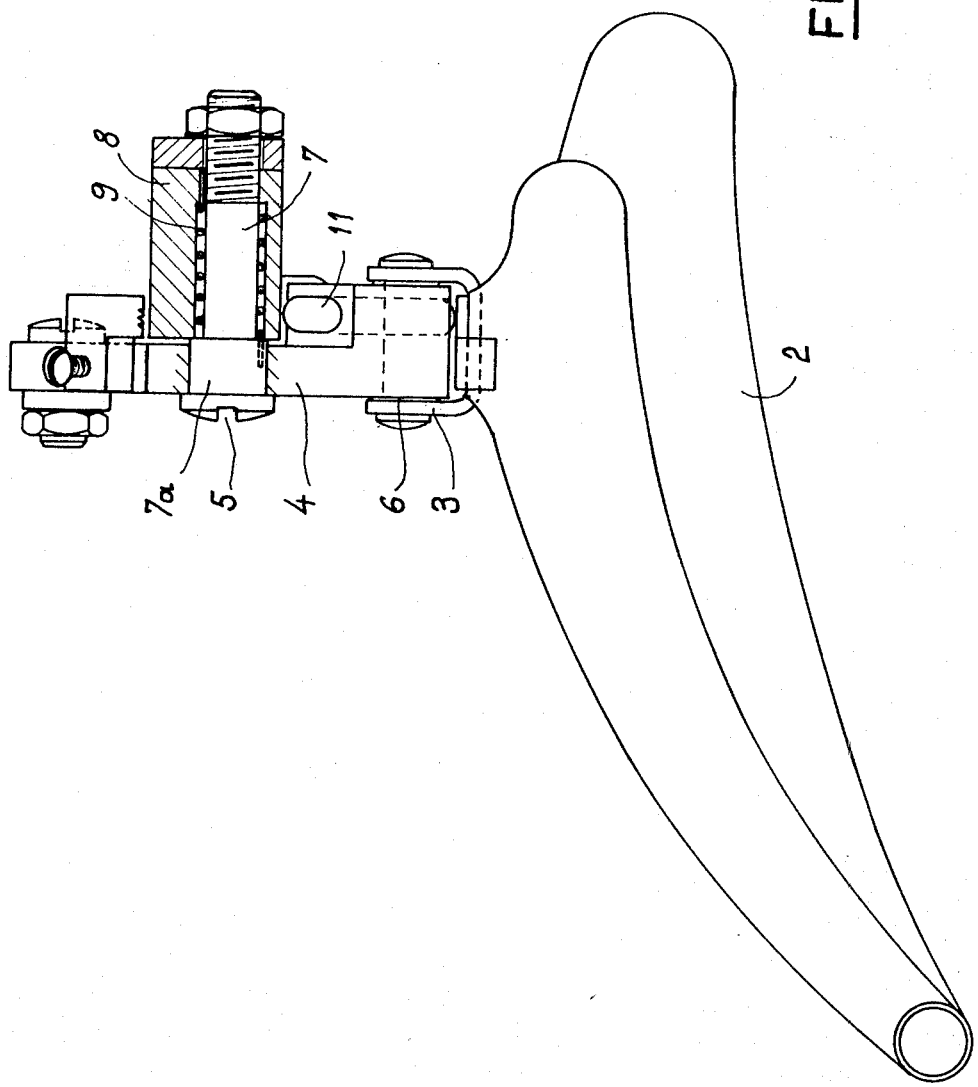
FIG. 3 is a sectional view taken on line 3—3 of FIG. 1.

In the embodiment shown in FIGS. 1 to 3, the crank-gear derailleur comprises a support means 1 constituted by a collar adapted to be fixed to a bicycle frame. The movable means for guiding and shifting the chain (not shown) comprises a fork member or yoke 2 which is pivotally mounted in its upper part by means of a U-shaped member 3 on an intermediate member 4 which is pivotally mounted on the fixed support means. The two pivot pins 5, 6 are parallel to each other. As can be seen in FIG. 3, the pin 5 pivoting the intermediate member to the fixed collar is formed by a bearing surface 7a of a screw 7 which extends through an aperture in a member 8 rigid with the collar, there being received in said aperture a return spring 9 which biases the mechanism to its position shown in FIG. 1.

The intermediate member comprises two parallel cavities 10 which are here formed by cylindrical bores which are symmetrically disposed relative to a plane containing the two pivot pins connecting the intermediate member to the movable means and the support means respectively. The axes of these two cavities are contained in a plane perpendicular to the pins 5 and 6.

Slidably mounted in these cavities are two identical push-members 11 whose rounded ends 12 are in contact with two parallel bearing surfaces 13, 14, one of which is formed on the fixed support means whereas the other is formed on the movable means. These two parallel surfaces are preferably coated with a layer 15 of an anti-friction material or are made directly from a material which allows a sliding of the push-members along these surfaces with a minimum of friction.

The mechanism is completed by actuating means, here comprising a cable 16 whose sheath 17 bears against a tab 18 of the collar and whose cable proper extends through an orifice 18a in said tab and is fixed on a cable clamp 19 carried by a lever arm 20 rigid with the intermediate member 4.

Also provided are two adjustable abutments 21, 22 which are provided with braking means and are adapted to determine the two end positions of the mechanism. Such abutments are conventional in this art and therefore need not be described in detail.

This mechanism operates in the following manner:

Assuming that it occupies the position shown in FIG. 1 towards which it is biased by the spring 9, if a traction is exerted on the actuating cable, the intermediate member and the lever 20 pivot in the direction of arrow F. This pivoting movement is guided by the two push-members 11 which bear against the bearing surfaces 13 and 14 and the mechanism finally reaches the position shown in FIG. 2.

This mechanism therefore guides the movement of the fork member in translation relative to the fixed support means, which corresponds to the desired result. Further, its construction is particularly simple since it comprises only two pivot pins instead of four and a single intermediate member instead of two. This intermediate member and the two push-members are particularly simple in construction. Moreover, and this is essential, the assembly of this mechanism is very simplified relative to that of the prior art and may be easily automatized, which results in a substantial reduction in the cost of manufacture.

Figure 4:
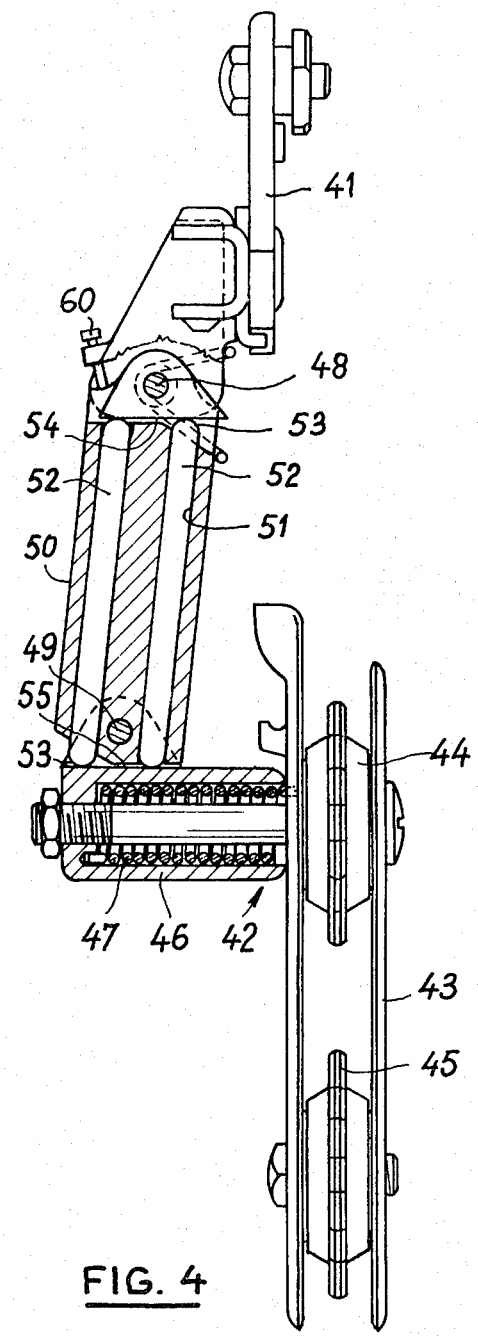
FIG. 4 is a view partly in elevation and partly in section of a mechanism according to the invention applied to a rear derailleur.
Figure 5:
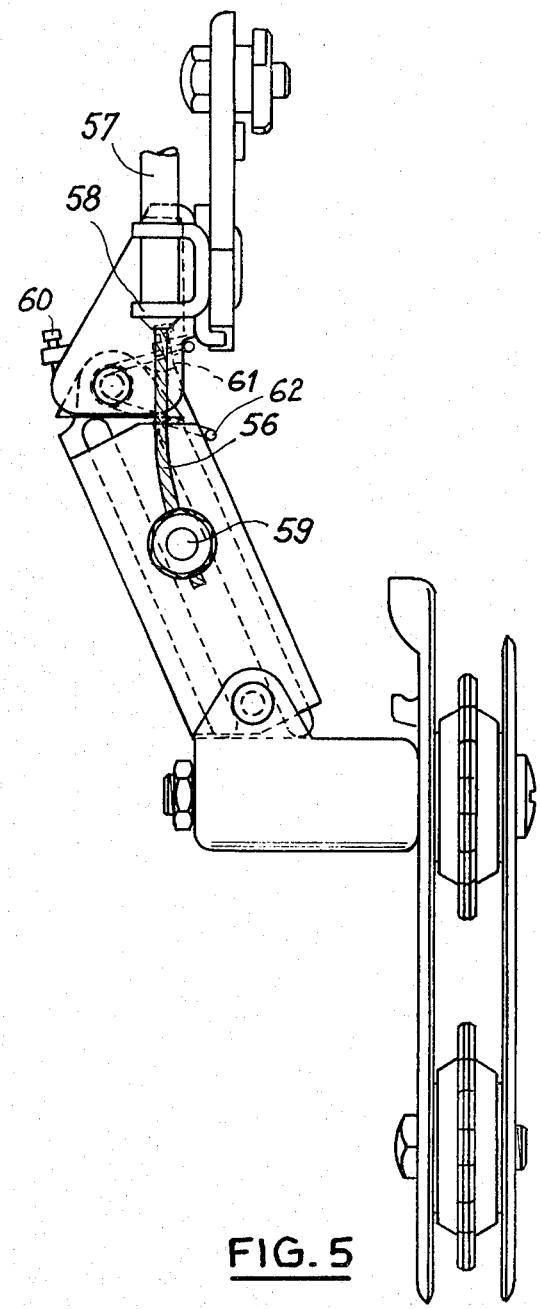
FIG. 5 is an elevational view of this last-mentioned mechanism is another position of use.

In the embodiment shown in FIGS. 4 and 5, the invention is applied to a rear derailleur comprising a support plate 41 adapted to be fixed to the frame lug of the rear stay of a bicycle, and movable means 42 for guiding the chain and comprising in the conventional manner a yoke 43 on which a chain guide roller 44 and a chain tensioning roller 45 are rotatively mounted. Also conventionally, this yoke is pivotally mounted on a member 46 in which a chain tensioning spring 47 is disposed.

As in the foregoing embodiment, the movable means 42 and the support means 41 are both pivotally mounted by two parallel pins 48, 49 on an intermediate member 50 in which are defined two cavities 51 in which two parallel push-members 52 are slidable. These two push-members have rounded ends 53 which bear against two parallel surfaces 54, 55 which are formed on the support and on the movable means respectively and provided with an anti-friction material.

Actuating means are provided which comprise, for example, a cable 56 whose sheath 57 bears against a tab 58 rigid with the fixed support and whose cable proper is fixed to a cable clamp 59 carried by the intermediate member.

Also provided in the conventional manner are two adjustable abutments 60, 61 which determine the end-of-travel positions of the mechanism which are respectively shown in FIGS. 4 and 5, and a return spring 62.

The operation of this rear derailleur need not be described since it is conventional and the advantages mentioned in respect of the first embodiment also apply to this modification.

It will be clear that many other constructional modifications may be made in the application of such a mechanism to a derailleur or other means. This, in particular, concerns the relative position of the intermediate member relative to the fixed support means and to the movable means and the position and orientation of its pivot pins. Further, many modifications may be made in respect of the shape of the cavities and push-members.

Having now described my invention what I claim as new and desire to secure by Letters Patent is:

1. A guiding and actuating mechanism, in particular for a bicycle derailleur, said mechanism comprising a support means, movable means, connecting means connecting the movable means to the support means so that the movable means is movable in translation relative to the support means, actuating means for moving the movable means, said connecting means comprising an intermediate member, a pivot pin pivotally connecting the support means to the intermediate member adjacent one end of the intermediate member, a pivot pin pivotally connecting the movable means to the intermediate member adjacent an opposite end of the intermediate member, the two pivot pins being parallel to each other, said intermediate member defining two parallel cavities which extend in a direction orthogonal to the direction in which said two pivot pins extend, two push-members slidably mounted in the two cavities, the movable means defining a first surface, the support means defining a second surface parallel to said first surface, said pins having ends respectively in contact with said first and second surfaces.

2. A mechanism according to claim 1, wherein the two cavities are disposed symmetrically on each side of a plane containing said two pivot pins.

3. A mechanism according to claim 1, wherein said first surface and said second surface are constituted by an anti-friction material.

4. A mechanism according to claim 1, wherein said first surface and said second surface are coated with an anti-friction material.

5. A mechanism according to claim 1, wherein the cavities are cylindrical and the push-members are cylindrical and have rounded end portions.

6. A mechanism according to any one of the claims 1 to 5, wherein a lever, on which lever the actuating means is fixed, is rigid with the intermediate member.

7. A mechanism according to any one of the claims 1 to 5, wherein the actuating means is directly fixed to the intermediate member.

* * * * *